United States Patent [19]

Barker et al.

[11] 3,748,002

[45] July 24, 1973

[54] INTERLOCKING, RING TYPE BALL BEARING WITH SEALS

[75] Inventors: James E. Barker, Chula Vista; Howard R. MacDonald, San Diego, both of Calif.

[73] Assignee: Rohr Industries, Inc., Chula Vista, Calif.

[22] Filed: May 21, 1971

[21] Appl. No.: 145,740

[52] U.S. Cl.............................. 308/174, 308/198
[51] Int. Cl........................ F16c 19/14, F16c 33/00
[58] Field of Search..................... 308/198, 183, 174

[56] References Cited
UNITED STATES PATENTS

| | | | |
|---|---|---|---|
| 2,315,574 | 4/1943 | Andersen | 308/198 |
| 2,449,138 | 9/1948 | Phillips | 308/198 |
| 2,488,825 | 11/1949 | Palumbo | 308/183 |
| 3,200,586 | 8/1965 | Ernest | 239/265.35 |
| 3,260,049 | 7/1966 | Johnson | 239/265.35 |
| 3,525,475 | 8/1970 | Schweild | 239/265.35 |

FOREIGN PATENTS OR APPLICATIONS

| | | | |
|---|---|---|---|
| 1,129,117 | 5/1962 | Germany | 308/183 |

*Primary Examiner*—Charles J. Myhre
*Assistant Examiner*—Frank Susko
*Attorney*—George E. Pearson

[57] ABSTRACT

A fail-safe ring type ball bearing capable of supporting a cantilever load comprises a first bearing race having an annular end flange extending therefrom, and a second bearing race having an annular, co-axial groove in an end thereof, the flange of the first bearing race being inserted co-axially into the groove of the second bearing race. Two rows of bearing balls ride in raceways provided one in each side of the annular flange, and one in each of the sides defining the groove. The two rows of balls support the races for relative rotation and in interlocking relation with each other. An additional row of bearing balls also may ride in raceways formed in the top of the flange and the bottom of the groove. An important use for the invention is to rotatively interconnect adjacent segments of a vectoring nozzle for an aircraft jet engine.

3 Claims, 6 Drawing Figures

Patented July 24, 1973

INVENTOR.
JAMES E. BARKER
HOWARD R. MACDONALD

BY *George B. Pearson*
ATTORNEY

Patented July 24, 1973 3,748,002

INVENTOR.
JAMES E. BARKER
HOWARD R. MACDONALD

BY *George E. Pearson*
ATTORNEY

INTERLOCKING, RING TYPE BALL BEARING WITH SEALS

BACKGROUND OF THE INVENTION

It is well known that a segmented duct or conduit having adjacent segments thereof rotatively interconnected by annular joints, wherein each joint is disposed in a plane inclined at an acute angle to the axis of both duct segments, can, by rotating the segments relatively through selected angles, dispose the duct segments with their respective axes at varying angles to each other.

Such an arrangement is provided for example, in the well known adjustable "stovepipe" elbow, widely used for many years in stove and furnace pipes, rain gutter downspouts, etc. A generally similar adjustable duct structure is shown applied to a jet engine exhaust duct in U.S. Pat. No. 2,933,891. However, with some prior types, the joints between segments of an adjustable exhaust duct such as that shown in said U.S. Pat. No. 2,933,891 may tend to leak or bind when exposed to high temperature and substantial pressure and stress.

SUMMARY OF THE INVENTION

The present invention provides a ring type ball bearing which is particularly well adapted, among other uses, to connect adjacent segments of a jet engine exhaust duct or vectoring nozzle so as to permit rotative, angular adjustment of adjacent segments thereof, and which is capable of being sealed to prevent leakage at the duct joints. The internal structure of the bearing may also be sealed so that gas or other fluid of a desired nature and temperature can be forced into or circulated through the ball races if required.

A primary objective of the invention is to provide a failsafe, ring-type ball bearing wherein two bearing races of substantially equal diameter are relatively interlocked in ball bearing relation by bearing balls fitted for rolling, interlocking movement in ball raceways formed in opposite sides of a flange provided on one of the bearing races, and also in opposite sides of an end groove in the other bearing ring into which the flange is co-axially inserted. A third row of bearing balls may be provided for added thrust support between the top of the flange and the bottom of the groove, and seal means preferably are provided to seal the joint between the two races. The interior of the bearing may also be sealed off, and a duct provided through which pressurized fluid of desired temperature or other characteristics may be introduced therein.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 2:
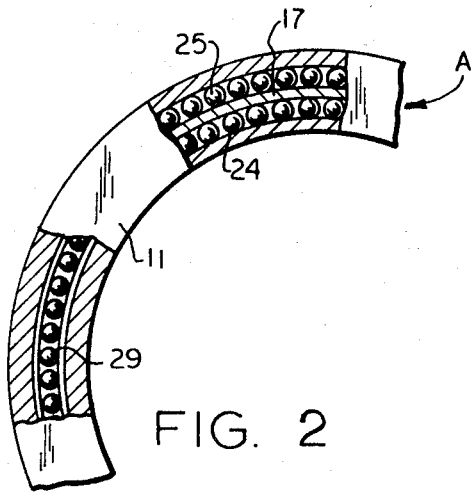
FIG. 2 is a fragmentary, somewhat diagrammatic, plan view of a segment of a bearing such as that shown in FIG. 1, a first portion thereof being broken away along line 2—2 of FIG. 1, and a second portion being broken away through the single row of balls of the same figure.
Figure 1:
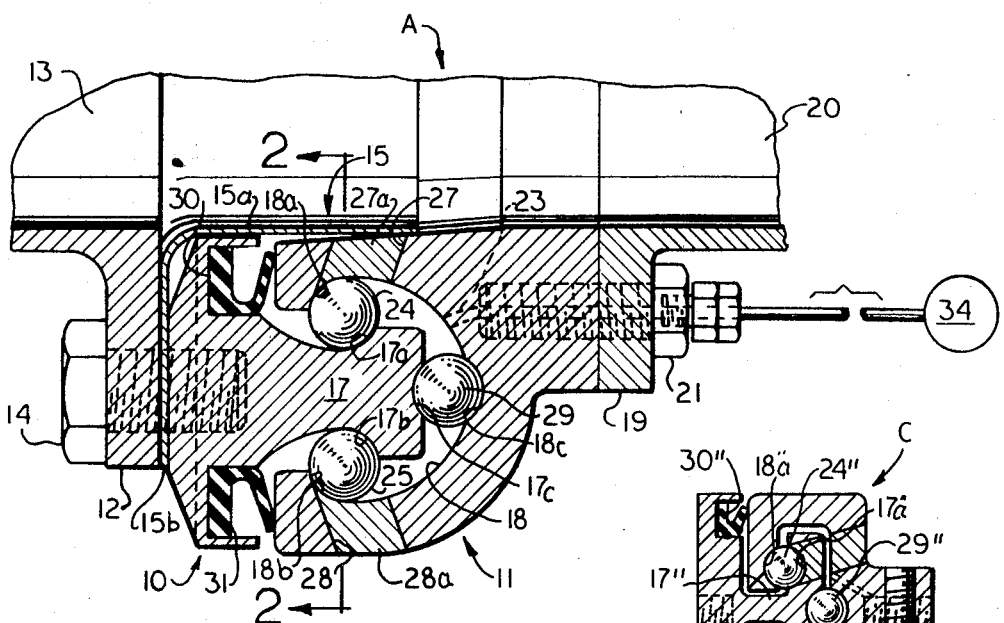
FIG. 1 is a fragmentary, sectional view taken along a radial plane through a joint between two duct sections connected by a ring type ball bearing embodying the present invention.

Referring to the drawings in detail, and considering first the form of the invention shown in FIGS. 1 and 2, a ring type ball bearing A comprises two annular races 10 and 11. Race 10 is of a diameter to fit co-axially upon a mounting flange 12 provided around one end of a duct segment 13 of a segmented, vectoring exhaust nozzle C, see FIGS. 4 and 5, for an aircraft jet engine, not shown. As is common practice in the manufacture of such nozzles, either the segments thereof are oval in cross section so that when cut along a selected diagonal plane the cut ends defined by the plane are circular, or the cut ends are formed to circular shape. Regardless of how it is achieved, however, the mounting flange 12 is substantially circular, and the circular bearing race 10 fits thereon and is securedly attached thereto by machine screws 14.

A sealing sleeve 15, see FIG. 1, of suitable material, such as, for example, stainless steel, has a thin-wall tubular portion 15a which fits into and spans the joint between the bearing races 10 and 11, and an end flange 15b which is gripped between the duct flange 12 and the bearing race 10.

A co-axial end flange 17 extends from the other end of the bearing race 10 than that secured to the flange 12, and co-axial ball raceways 17a and 17b are formed, respectively, in opposite sides of the flange 17 by conventional machining procedures. A third ball raceway 17c is also formed in the outer end or top of the flange 17.

The other bearing race 11 has an endwise opening groove 18 therein of a size and shape to receive the flange 17 in co-axial, centered relation therein. The race 11 is mounted on a flange 19 provided on an end of duct segment 20, and is securely attached in sealed relation thereto by screws 21, one or more of which preferably has an axial hole therethrough. A small hole 23 is also counterbored in the bottom of the threaded hole for the screw 21 in the bearing race 11, and communicates with the interior of the bearing A so that coolant gas or other selected fluid can be introduced therethrough.

Ball raceways 18a and 18b are machined co-axially, by well known procedures, in opposite side walls of the groove 18, and are of the same diameter, and are located opposite the raceways 17a and 17b, respectively, when the end flange 17 is inserted co-axially into the groove 18 to receive rows of bearing balls 24 and 25, respectively, for interlocking, rolling movement of the balls along their respective raceways as best shown in FIG. 1.

Two rows of bearing balls 24 and 25 may be introduced between respective pairs of opposed raceways through ports 27 and 28, respectively, provided in the sides of the race 11 defining the groove 18. These ports 27 and 28 are subsequently sealed by plugs 27a and 28a, respectively, of a metal corresponding to that of the grooved bearing race 11, the inner ends of the plugs 27a and 27b being machined to conform to their respective raceways. The plugs are secured in flush fitted position in their respective ports as by welding, brazing or silver soldering.

In the event that it is desired to mount the bearing balls in conventional cages, not shown, to maintain separation, the race 11 may be made in two or more separate parts in a well known manner, and the parts assembled and secured after intersecting the ball cages.

A third row of bearing balls 29 is provided between the raceway 17c in the top of the flange 17 and a raceway 18c formed in the bottom of the groove 18. The balls 29 of this third row are inserted in a well known manner when inserting the flange 17 into the groove 18.

A pair of conventional seal rings 30 and 31 are fitted into channels provided one in each side of the race 10, and have wiping, sealing engagement with end faces provided one on each side wall of the groove 18.

OPERATION

The operation of the bearing A when assembled with nozzle segments 13 and 20 as shown in FIGS. 1 and 2 is as follows: The two nozzle segments 13 and 20 are interlocked and supported for relative rotative adjustment by the two rows of bearing balls 24 and 25 operating in their respective raceways. The ball bearing A thus formed is capable of supporting a substantial cantilever load without adversely affecting bearing operation. The third row of bearing balls 29 provides substantial additional thrust bearing capacity in the event that it should be needed, and retains the races against runout in the event of slight looseness.

In installations wherein the bearing A may be subjected to undesirable variation in temperature, or other factors require it, suitable fluid, such as a coolant gas or liquid, a lubricant, or other treating fluid can be introduced through the hollow screw 21 into the sealed interior of the bearing A from a suitable pressurized fluid supply 34. Fluid evacuating means, not shown, also may be provided if required by means of a second hollow screw, not shown, similar to the screw 21, for example, to circulate such fluid through the sealed interior of the bearing A.

MODIFICATION OF FIG. 3

Figure 3:
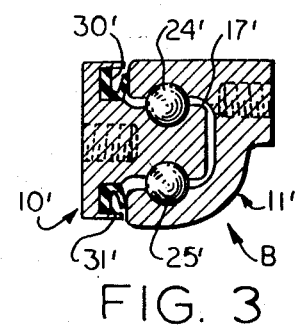
FIG. 3 is a sectional view in reduced scale along a radial plane through a modified form of ball bearing embodying the invention.

In a modified form of the invention shown in FIG. 3, the parts of a bearing B correspond generally to those of the bearing A of FIG. 1, and said parts are, therefore, designated by the same reference numerals as in FIG. 1 with the prime (') added. The principal difference between the bearings A and B consists in the omission of the third row of bearing balls 29 from the bearing B. The modified structure and operation of the bearing B will be apparent to one familiar with the structure and operation of the form A of the invention shown in FIGS. 1 and 2 and described previously herein.

MODIFICIATION OF FIG. 4

Figure 4:
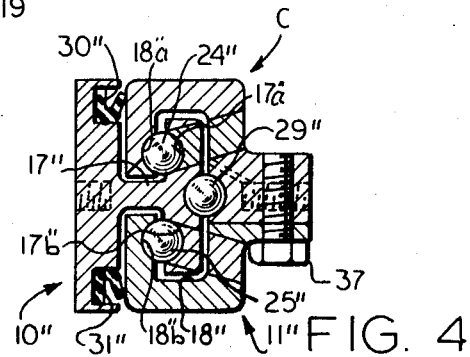
FIG. 4 is sectional view similar to FIG. 3 showing a further modified form of the invention.
Figure 5:
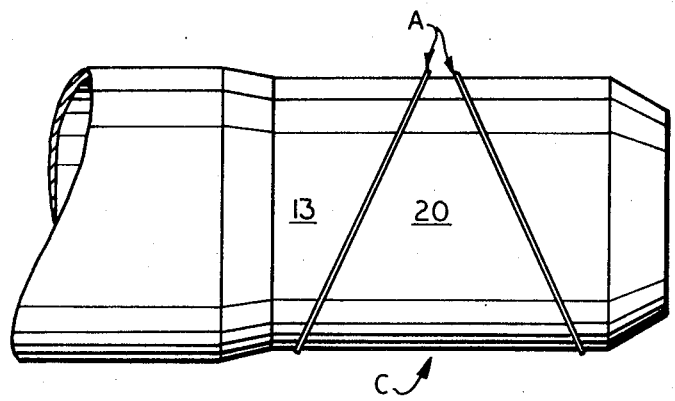
FIG. 5 is a fragmentary, side, elevational view showing the terminal, portion of an angularly adjustable, segmented aircraft jet engine exhaust duct with the segments aligned in co-axial relation.
Figure 6:
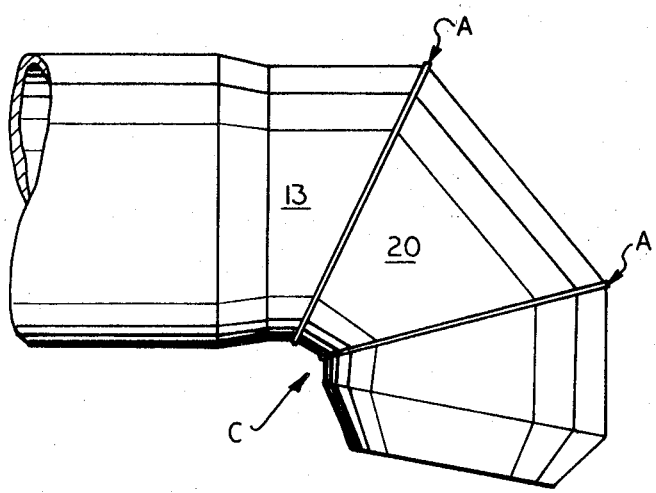
FIG. 6 is a view similar to FIG. 4 but with the intermediate segment turned through an angle of approximately 180°.

In a further modified form of the invention shown in FIG. 4, the parts of a ring type ball bearing E correspond generally to those of the bearing A of FIG. 1. Said parts are, therefore, designated by the same reference numerals as their respective counterparts of FIG. 1 with the double prime ('') added.

In the bearing E of FIG. 4 the terminal portion of the flange 17'' of race 10'' is widened to modified T-shape, and the ball raceways 17a'' and 17b'' are on the under side of the head of the T. Also, the side walls defining the groove 18'' in the race 11'' underlie the sides of the T-shaped flange 17'', and the ball raceways 18a'' are spaced therefrom radially of the bearing. The race 11'' may be made in two or more parts to facilitate assembly of the bearing, and secured in assembled form as shown by screws 37. The bearing balls may be mounted in their respective raceways in a manner which will be obvious to one familiar with the art, or substantially as described previously herein.

The invention provides a ring type ball bearing of simple, light, but strong construction, which does not require pre-loading, and is capable of supporting substantial cantilever loads. The bearing is substantially fail-safe since the balls tend to lock the races together, and is capable of being readily sealed, not only to prevent leakage between adjacent duct segments which it interconnects, but also to allow pressurization of the interior of the bearing to exclude dirt and other contaminants and to circulate selected fluids therein for cooling or other fluid treatment as required.

Having thus described my invention, what I claim as new and useful and desire to protect by U.S. Letters Patent is:

1. A ring type ball bearing comprising,
   a first annular race,
   an annular flange of T-shape cross sectional shape with the stem portion thereof extending co-axially from the first race,
   a pair of annular ball raceways formed co-axially in oppositely facing surfaces of said flange and extending beneath the underside of the head of the T-shape flange,
   a third annular ball raceway in the axially outer surface of the head of the T-shape flange,
   a second annular race of a diameter corresponding substantially to diameter of the first race,
   an annular groove with undercut side walls co-axially in the second race, the flange of the first race fitted co-axially therein,
   a pair of ball raceways formed co-axially in oppositely facing side walls of such groove, each raceway in the second race extending into its respective undercut side wall and being diagonally opposite to a raceway in the first race and spaced therefrom by the diameter of a selected bearing ball,
   a third ball raceway in the bottom of the annular groove, and spaced from the groove in the axially outer surface of the head of the T-shape flange by the diameter of a selected bearing ball, and
   an annular row of bearing balls fitted in rolling, bearing relation, one row thereof between each raceway in the flange and a raceway in the groove opposite thereto.

2. A ring type ball bearing as claimed in claim 1, wherein the head of the T-shape flange on the first annular race is wider than the entrance to the groove in the second annular race, the second annular race is divided into two annular parts in the plane of the race, the plane of division of the second annular race being axially offset from the annular groove in the second race, and means for securing the two annular parts of the second race together with all of the bearing balls in their respectively defined locations.

3. A ring type ball bearing as claimed in claim 2, wherein each raceway extending beneath the underside of the head of the T-shape flange is substantially opposite relation, radially of the ring type bearing, from the raceway opposite thereto in the undercut side wall of the groove.

* * * * *